United States Patent [19]

Denlinger et al.

[11] Patent Number: 4,867,597
[45] Date of Patent: Sep. 19, 1989

[54] RECESSED METAL-TO-PLASTIC JOINT

[75] Inventors: Keith R. Denlinger, Lancaster; William J. Rudy, Jr., Annville, both of Pa.

[73] Assignees: AMP Incorporated, Harrisburg, Pa.;

[21] Appl. No.: 212,771

[22] Filed: Jun. 17, 1988

Related U.S. Application Data

[62] Division of Ser. No. 07/049,631, May 13, 1987, Pat. No. 4,769,896.

[51] Int. Cl.⁴ .................... B29B 59/00; B21D 39/00
[52] U.S. Cl. .................... 403/285; 403/274; 403/277; 403/406.1; 264/272; 264/274; 264/296; 264/284; 29/513; 29/520; 29/522.1
[58] Field of Search .............. 403/274, 277, 406.1, 403/285; 439/108, 106, 405, 507, 404; 29/513, 520, 522.1; 264/249, 272, 274, 296, 284

[56] References Cited

U.S. PATENT DOCUMENTS

| | | | |
|---|---|---|---|
| 1,460,145 | 6/1923 | Seiss | 29/513 X |
| 2,309,713 | 2/1943 | Ratkowski | 403/274 X |
| 2,337,239 | 12/1943 | Hall | 29/513 X |
| 2,838,703 | 6/1958 | Balke | 29/513 X |
| 3,053,300 | 9/1962 | Quinto | 403/285 X |
| 3,177,561 | 4/1965 | Oeler et al. | 29/513 X |
| 3,308,225 | 3/1967 | Wells | 264/249 |
| 3,419,297 | 12/1968 | Diepenhorst et al. | 264/249 X |
| 3,888,063 | 6/1975 | Frantz | 403/172 |
| 4,059,897 | 11/1977 | Marquis | 29/522 R |
| 4,147,400 | 4/1979 | Snyder, Jr. et al. | 439/744 |
| 4,494,898 | 1/1985 | Brownbill | 29/520 X |
| 4,602,831 | 7/1986 | Lookard | 339/14 R |
| 4,633,559 | 1/1987 | Loren | 264/249 X |
| 4,655,515 | 4/1987 | Hamsher, Jr. et al. | 339/14 R |
| 4,697,340 | 10/1987 | Finney et al. | 29/522 R X |

FOREIGN PATENT DOCUMENTS

| | | | |
|---|---|---|---|
| 172176 | 2/1952 | Austria | 264/249 |
| 857868 | 12/1952 | Fed. Rep. of Germany | 264/249 |
| 740933 | 11/1955 | United Kingdom | 264/249 |

Primary Examiner—Randolph A. Reese
Assistant Examiner—Franco S. DeLiGuori
Attorney, Agent, or Firm—Anton P. Ness

[57] ABSTRACT

A small metal member (50) is secured to a surface (32) of a plastic member (30) by lock tabs (54) bent into a recess (34) in the surface (32), and the plastic material of a central boss (38) in the recess (34) is bulk deformed over ends (68) of the lock tabs (54) forming a recessed joint (70).

2 Claims, 7 Drawing Sheets

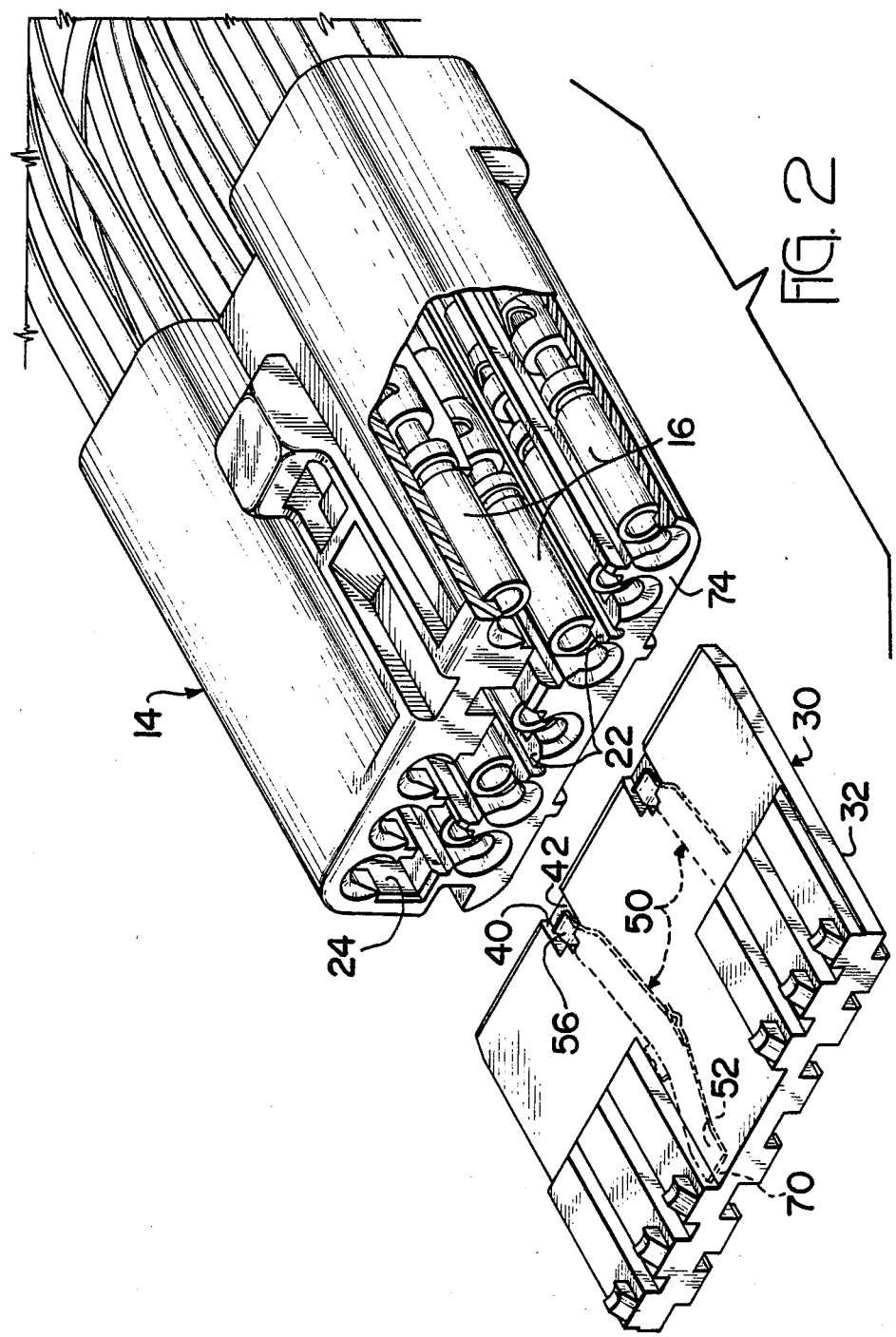

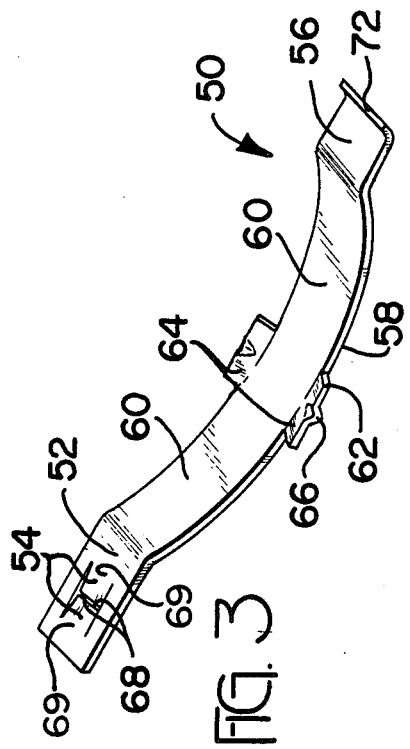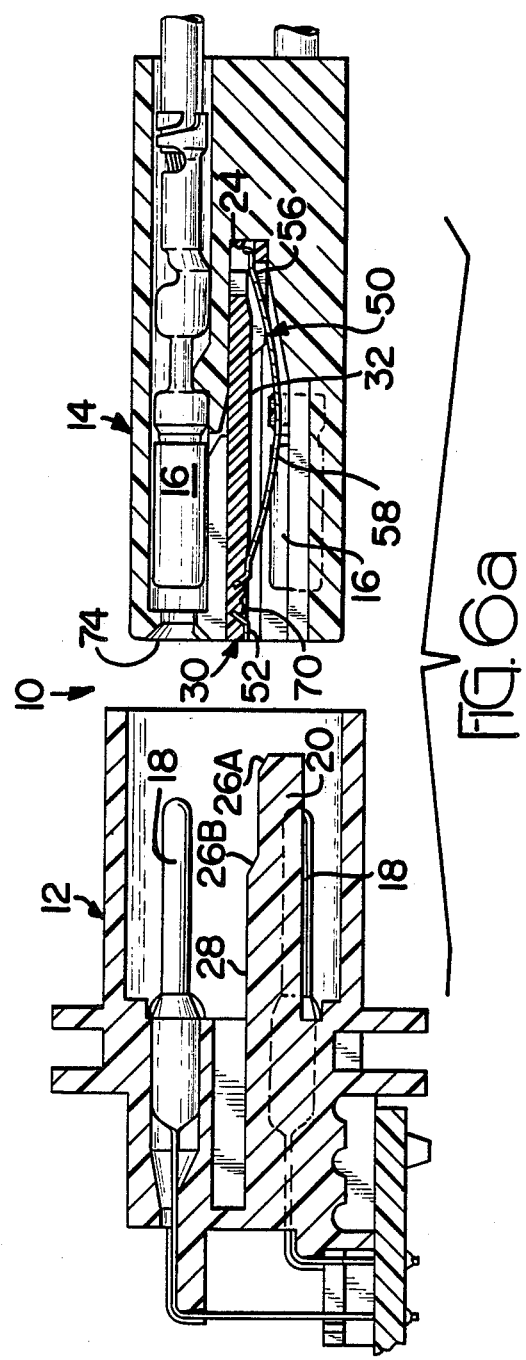

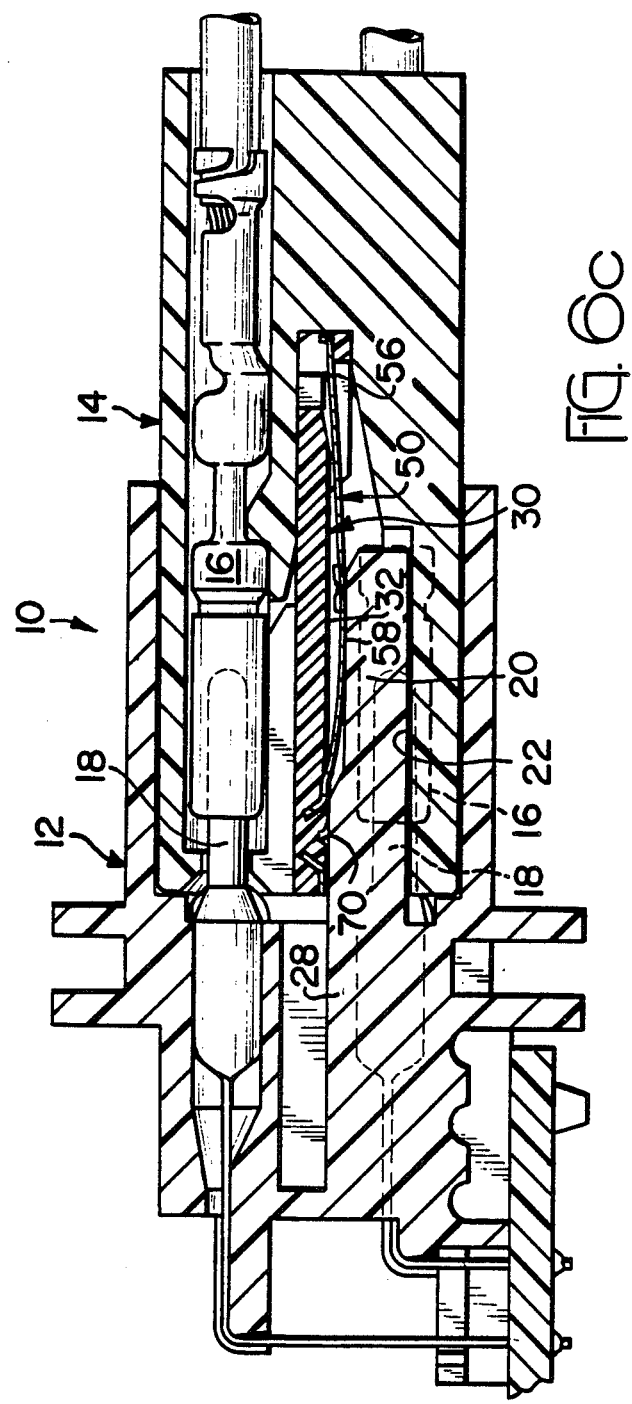

4,867,597

RECESSED METAL-TO-PLASTIC JOINT

REFERENCE TO RELATED APPLICATION

This application is a divisional of application Ser. No. 07/049,631 filed May 13, 1987, now U.S. Pat. No. 4,769,896.

FIELD OF THE INVENTION

The invention relates to joining articles and more particularly to forming a mechanical joint between a metal article and a plastic article.

BACKGROUND OF THE INVENTION

U.S. Pat. No. 4,655,515 discloses joining a plate-like metal ground plane of an electrical connector to a planar plastic dielectric substrate. A round boss on the substrate surface is extended through a hole in the ground plane and then the end of the boss is enlarged by being deformed by cold-staking or heat-staking as is conventionally known, to form a low profile mechanical joint without fasteners and which does not utilize adhesive material. The deformed end of the boss now extends laterally over the periphery of the hole to some extent.

It is desirable to form a metal-to-plastic mechanical joint which does not extend above the metal member surface so that the metal member surface may comprise at least a non-stubbing surface for movement of another article with respect thereto.

The present invention secures a planar metal member to the surface of a plastic member by a mechanical joint recessed into the surface of the plastic article. A pair of opposing lock tabs are stamped into the metal member at each joint location. The plastic member is molded to have a recess at each joint location within which is disposed an upstanding central boss. When the metal member is placed against the surface of the plastic member with lock tabs over the corresponding recess, a work end of a tool bends the lock tabs into the recess against preferably sloped recess sides. The tool also cold-stakes the central boss to permanently deformingly enlarge the top thereof laterally to overlap the free ends of the lock tabs which are now beside the central boss, thus forming a recessed joint.

The present invention can be used to create a commoning member for an electrical connector assembly as described in U.S. Pat. No. 4,786,258. The recessed joint is used to secure an end of an arcuate spring member against a surface of a plastic insert, the other end being a free end, so that when placed in a plug connector portions of the spring member are in engagement with a pair of adjacent socket contacts. Upon mating of the plug connector with a receptacle connector, a cantilever cam post of the receptacle connector is aligned with the spring member and top surface portions thereof pass over the fixed end of the spring member and over the recessed joint during mating, and a camming surface portion engages the arcuate section of the spring member and deflects the spring member out of commoning engagement with the pair of socket contacts. The free end of the spring member is retained in a recess under a bridge portion of the insert and is free to move axially in the recess to permit the arcuate spring member to be flattened during deflection, relieving stress on the recessed joint.

It is an objective of the present invention to provide a recessed mechanical joint securing a metal member to the surface of a plastic member.

An example of the invention will now be described with reference to the accompanying drawings in which:

FIG. 2 is a perspective view of a plug connector module of FIG. 1 exploded from which is a plastic insert having a pair of metal spring members joined thereto according to the present invention.

FIG. 3 is a perspective view of a spring member of FIG. 2.

FIGS. 6a, 6b and 6c are longitudinal section views sequentially showing the mating of the plug and receptacle connectors and deflection of a spring member.

DETAILED DESCRIPTION OF THE PREFERRED EMBODIMENT

Figure 1:
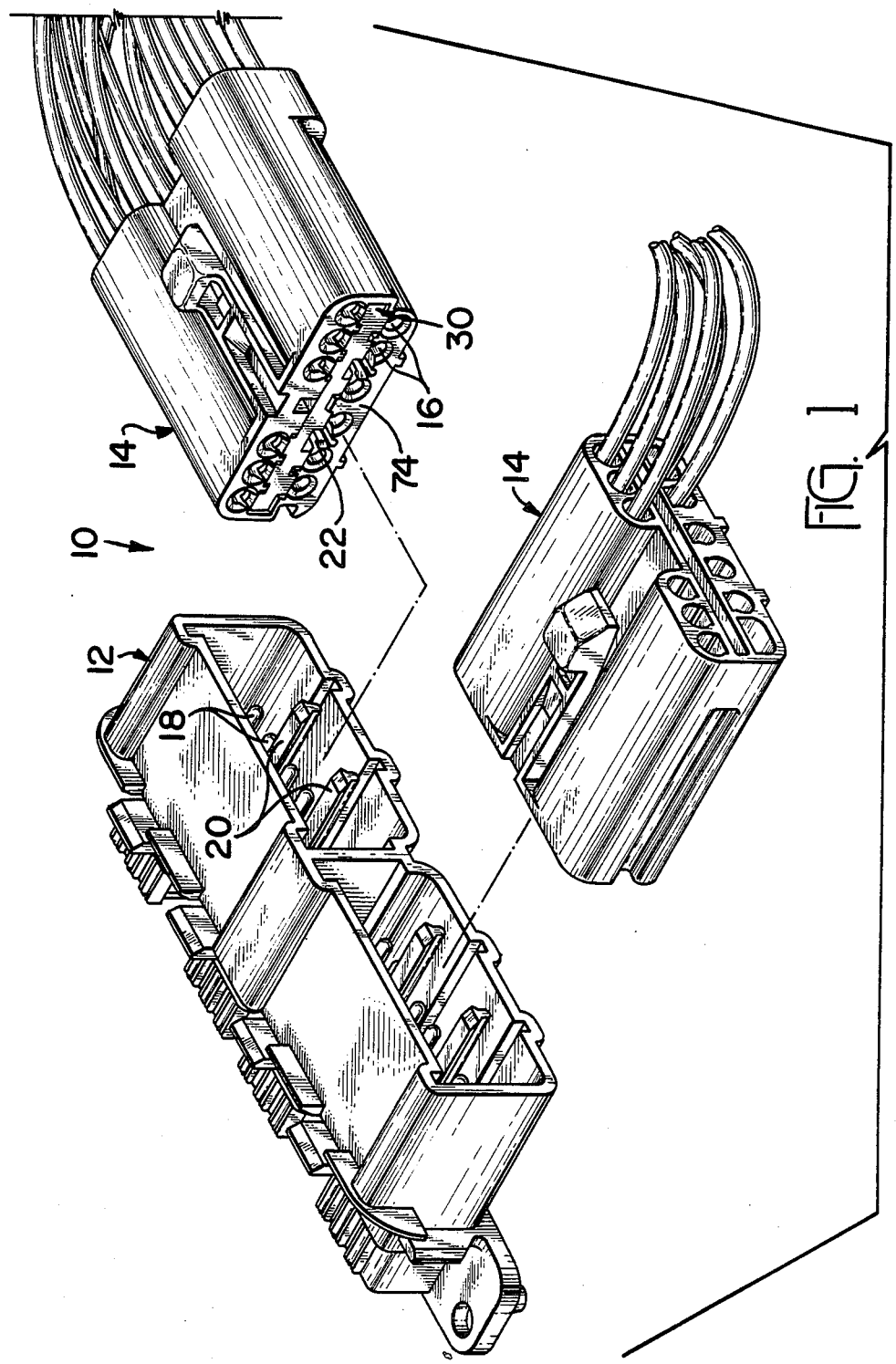
FIG. 1 is a perspective view of a pair of plug connector modules exploded from a receptacle connector.

In FIGS. 1 and 4 are illustrated an electrical connector 10 including a receptacle 12 and a pair of plugs 14 which mate with each other to form electrical connections between groups of terminals carried by the receptacle and each plug. Each plug 14 includes a pair of bridge contacts 50 each engageable with respective pairs of socket terminals 16 when the plug 14 is disengaged from the receptacle 12. The pair of socket terminals 16 may be connected to a remote sensor (not shown) which provides an indication when the plug 14 is disengaged from the receptacle 12 or when the plug and receptacle are improperly mated and the connector assembly requires servicing. The receptacle 12 carries between its rows of pin terminals 18 a cantilever cam post 20 corresponding to and aligned with each bridge contact of each plug 14, the cam posts 20 extending between pin terminals 18 corresponding to the bridged socket contacts 16 in the plug 14. When plug 14 is inserted into the receptacle 12, each cam post 20 extends into the plug between the bridge contact 50 and an opposed support surface 22 and lifts the bridge contact 50 away from the pair of socket terminals 16 it had been engaging. This disengagement deactivates the sensor and provides a remote indication that the plug and receptacle are properly mated with electrical connections formed between their respective terminals.

In FIG. 2 a pair of bridge contacts 50 are secured to the bottom surface 32 of a flat, blade-like plastic insert 30 which is insertable into an insert-receiving aperture 24 of plug 14 such that each bridge contact 50 is associated with and is aligned between a pair of socket terminals 16, after which bridge contact 50 will engage terminals 16 and common them.

In FIG. 3 each bridge contact 50 is formed from a length of flat sheet metal stock and includes a fixed end 52 having a pair of facing lock tabs 54, a free end 56 and a downwardly bowed spring section 58 having legs 60 joining the ends. At central crest 62 of spring section 58 wings 64 extend outwardly from the sides and preferably include V-shaped embossments 66 extending outwardly away from the contact surface. The wings and crest form a bridging element, with V-shaped embossments 66 to engage the pair of socket terminals 16 to be bridged upon full assembly of plug connector module 14. Lock tabs 54 extend toward and to each other at free ends 68 from respective spaced apart lock tab joints 69.

Figure 4A:
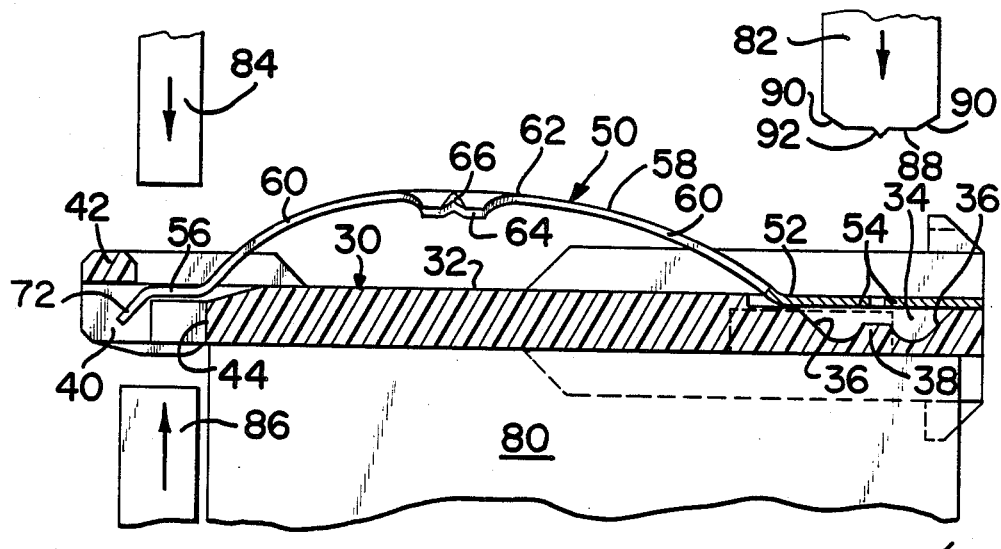
FIGS. 4a and 4b are longitudinal section views illustrating the method of the present invention.
Figure 4B:
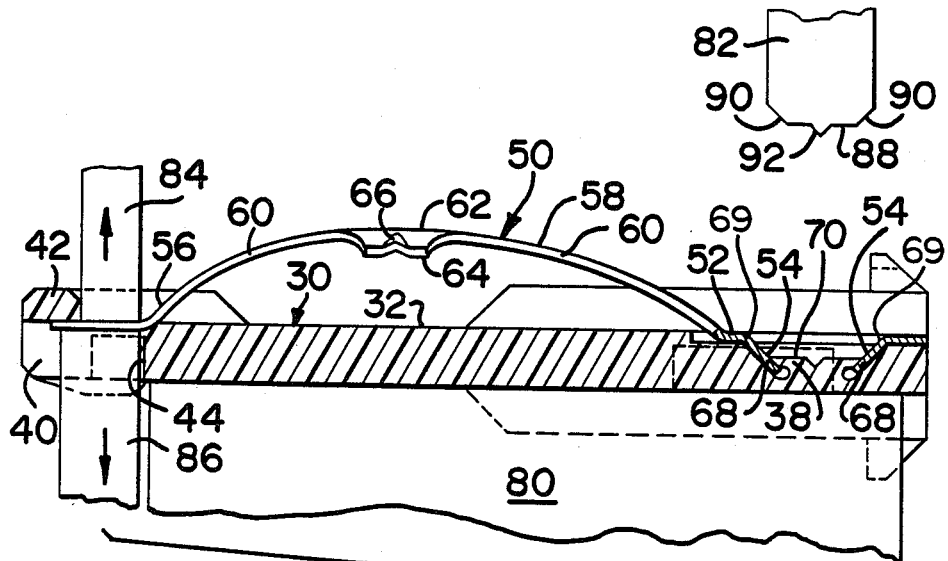

Referring to FIGS. 4a and 4b, a bridge contact 50 is shown being secured to insert 30 according to the present invention. Bridge contact 50 is placed atop surface 32 of insert 30 with the pair of lock tabs 54 over recess 34, which has sloped sides 36 and a central boss 38. Free end 56 originally having an end portion 72 bent to facilitate automated assembly is placed into relief recess 40 inwardly from bridge portion 42. Tooling is shown in FIG. 4a comprising a support 80 on which insert 30 is placed, punch 82 aligned with lock tabs 54 and recess 34, and a pair of punches 84,86 at free end 56. In FIG. 4b, punch 82 moves downwardly against end 52 with work end face 88 engaging lock tabs 54. Angled work surfaces 90 bend lock tabs 54 into insert recess 34 by rotating the lock tabs 54 about their respective lock tab joints 69, with free ends 68 being rotated past central boss 38 to a position adjacent and beside central boss 38. Punch 82 forces them against sloped recess sides 36 with tab free ends 68 beside central boss 38. Wedge 92 is forced into central boss 38 and bulk deforms plastic material thereof laterally outwardly over tab free ends 68 forming a recessed joint 70 securing lock tabs 54 within recess 34 and thus securing fixed end 52 of bridge contact 50 to insert 30. At free end 56 upper punch 84 is received behind bridge portion 42 and against free end 56, after which lower punch 86 is moved upwardly into tool-receiving recess 44 and against free end 56 from the opposite side, straightening the bend end portion 72 to extend under bridge portion 42 to confine free end 56 against relatively outward movement away from surface 32 of insert 30. Having been completely assembled to insert 30, bridge contact 50 can receive a force against crest 62 deflecting spring section 58 toward insert surface 32 which will result in free end 56 being free to move laterally relatively away from fixed end 52.

Figure 5:
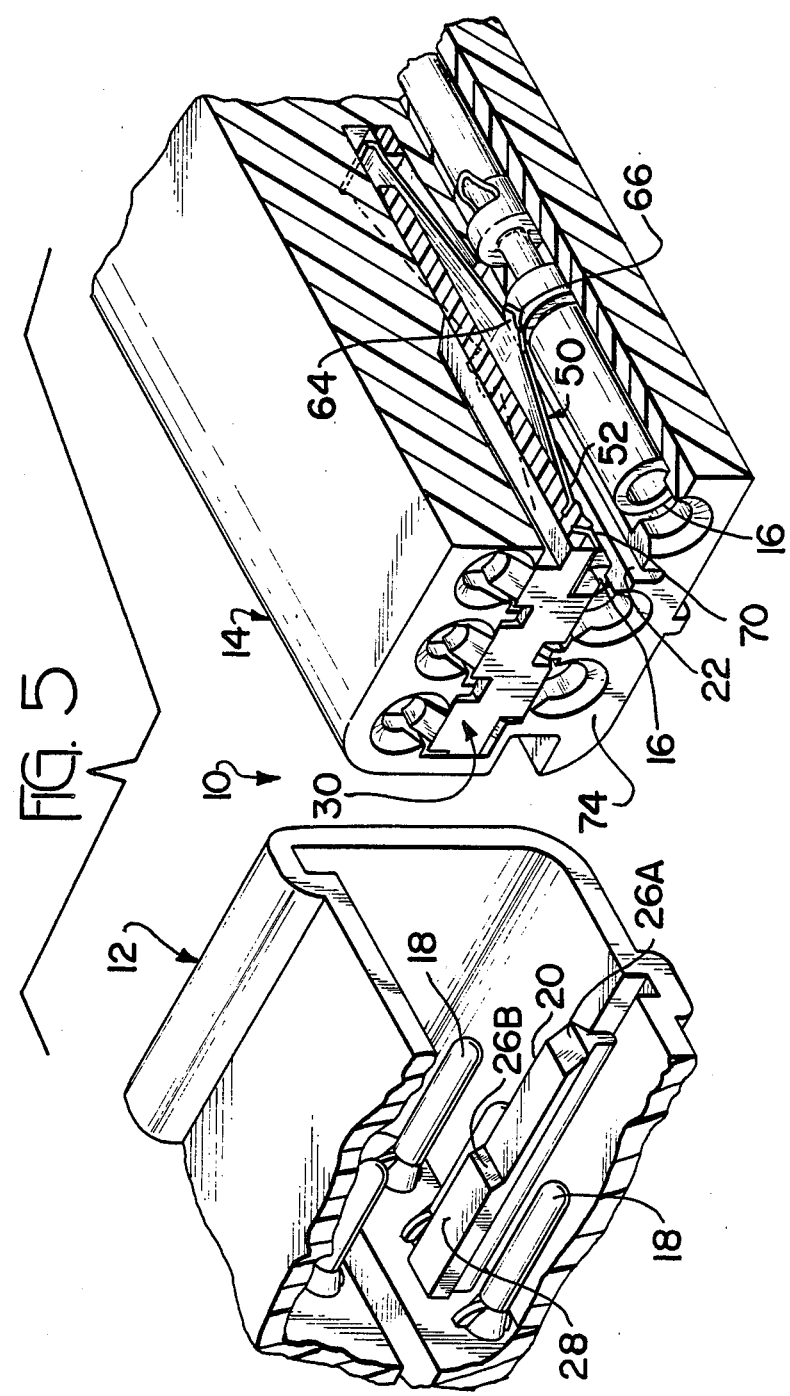
FIG. 5 is a part perspective view showing portions of the plug and receptacle connectors of FIG. 1 about to be mated.

In FIG. 5, insert 30 with bridge contact 50 secured thereto has been secured in insert-receiving aperture 24 of plug connector module 14 with V-shaped embossments 66 of wings 64 slightly loaded against a pair of adjacent socket terminals 16 commoning them. Joint 70 at fixed end 52 is disposed proximate mating face 74 of plug 14. Cam post 20 has a pair of spaced tapered surfaces 26A,26B forwardly of top surface 28, which will engage and deflect upwardly spring section 58 of bridge contact 50 during mating of plug 14 and receptacle 12 which cam post 20 will be supported by support surface 22 opposed from bridge contact 50.

Figure 6B:
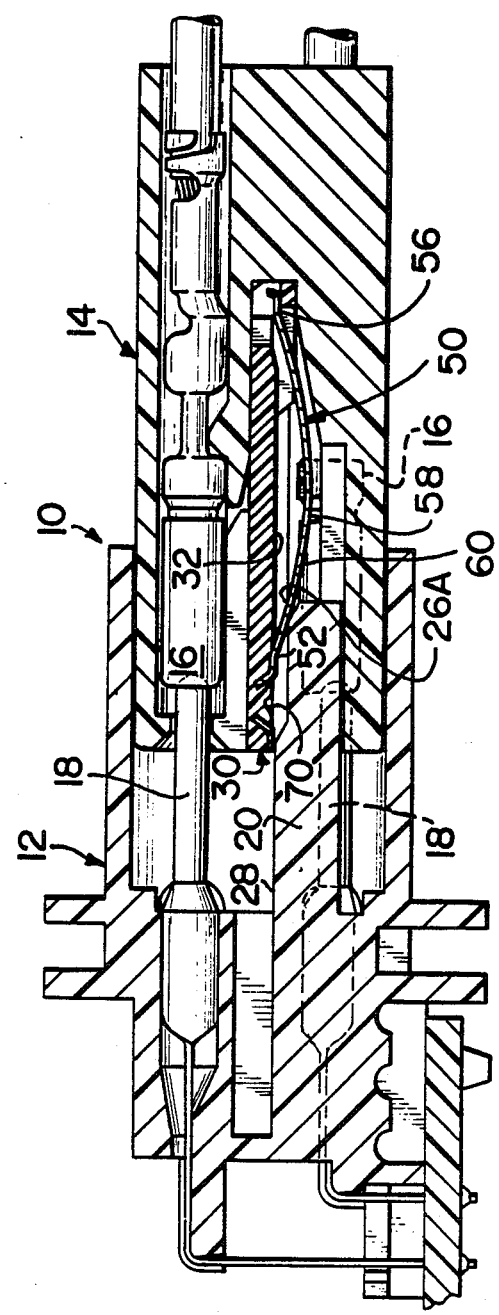

In FIGS. 6a, 6b and 6c plug 14 is being mated with receptacle 12 to define electrical connector 10. Cam post 20 enters plug 14 between command socket terminals 16 and between bridge contact 50 and support surface 22 as plug 14 enters receptacle 12. Pin contacts 18 preferably first electrically engage corresponding socket terminals 16, as seen in FIG. 6b. Then forward tapered surface 26A cammingly engages the forward one of legs 60 of spring section 58 and begins deflection of spring section 58 toward insert surface 32, which disengages bridge contact 50 from socket terminals 16 and moves free end 56 within relief recess 40 toward the bottom of recess 24 while bearing against surface portions of insert 30 just forwardly of relief recess 40. In FIG. 6c, plug 14 has been inserted fully into receptacle 12 for full mating, with pin and socket terminals 18,16 electrically connected, spring section 58 has been flattened along insert 30 and top surface 28 of cam post has passed along recessed joint 70 at fixed end 52 of bridge contact 50 to fill the space between the formerly bridged pair of socket terminals 16.

The present invention can be utilized to secure a metal member to a plastic surface at several recessed joints, if desired, where mechanical securing is preferred over adhesive bonding.

What is claimed is:

1. A joint between a metal member and a surface of a plastic member comprising:

a plastic article including a surface, and a metal article including at least a portion thereof disposed adjacent said surface of said plastic article;

a recess in said surface of said plastic article beneath said metal article portion, said recess having a central boss therein; and a pair of lock tabs of said metal article portion bent into said recess with free ends adjacent said central boss, with material of said central boss bulk deformed over said lock tab free ends, whereby a mechanical joint is defined between said metal and plastic articles which is recessed below the surface of the plastic article.

2. A joint as set forth in claim 1 wherein said recess includes sloping side walls against which said lock tabs are bent.

* * * * *